US006909582B2

(12) United States Patent
Habata

(10) Patent No.: US 6,909,582 B2
(45) Date of Patent: Jun. 21, 2005

(54) HEAD SUSPENSION ASSEMBLY AND DISK DRIVE PROVIDED WITH THE SAME

(75) Inventor: Masaaki Habata, Higashiyamato (JP)

(73) Assignee: Kabushiki Kaisha Toshiba, Tokyo (JP)

(*) Notice: Subject to any disclaimer, the term of this patent is extended or adjusted under 35 U.S.C. 154(b) by 124 days.

(21) Appl. No.: 10/317,172

(22) Filed: Dec. 12, 2002

(65) Prior Publication Data

US 2003/0142446 A1 Jul. 31, 2003

(30) Foreign Application Priority Data

Jan. 31, 2002 (JP) .................................. 2002-024762

(51) Int. Cl.[7] ............................................. G11B 5/60
(52) U.S. Cl. .................................................. 360/245.9
(58) Field of Search ........................... 360/244.1, 245.9

(56) References Cited

U.S. PATENT DOCUMENTS

| 5,956,211 A | * | 9/1999 | Adley ..................... 360/244.1 |
| 6,144,530 A | | 11/2000 | Shiraishi et al. |
| 6,498,702 B1 | * | 12/2002 | Shimizu et al. .......... 360/244.1 |
| 6,621,662 B1 | * | 9/2003 | Khan et al. .............. 360/244.1 |
| 6,639,757 B2 | * | 10/2003 | Morley et al. ........... 360/245.9 |
| 2002/0032958 A1 | | 3/2002 | Habata |
| 2002/0131210 A1 | | 9/2002 | Habata |

FOREIGN PATENT DOCUMENTS

| JP | 3-187295 | 8/1991 |
| JP | 11-185233 | 7/1999 |
| JP | 2000-311324 | 11/2000 |

OTHER PUBLICATIONS

Office Action, Dated Mar. 2, 2004 ( with and English Translation) for Japanese Patent Application No. 2002–024762, upon which reliance is made for priority in this application.

* cited by examiner

*Primary Examiner*—Robert S. Tupper
(74) *Attorney, Agent, or Firm*—Pillsbury Winthrop LLP

(57) ABSTRACT

A head suspension assembly includes an arm and a suspension extending from the arm. The arm has an opening portion penetrating the arm. A trace is located on the arm and the suspension and extends opposite the opening portion. A radiator plate is attached to an outer surface of the trace and extends at least opposite the opening portion. A head IC is located in the opening portion and connected electrically to a wiring pattern of the trace.

12 Claims, 4 Drawing Sheets

HEAD SUSPENSION ASSEMBLY AND DISK DRIVE PROVIDED WITH THE SAME

CROSS-REFERENCE TO RELATED APPLICATIONS

This application is based upon and claims the benefit of priority from the prior Japanese Patent Application No. 2002-024762, filed Jan. 31, 2002, the entire contents of which are incorporated herein by reference.

BACKGROUND OF THE INVENTION

1. Field of the Invention

The present invention relates to a head suspension assembly having a head IC and a disk drive provided with the same.

2. Description of the Related Art

A magnetic disk drive as a disk drive generally comprises a magnetic disk located in a case, a spindle motor for supporting and rotating the magnetic disk, and a head suspension assembly that includes a magnetic head for reading information from and writing it to the magnetic disk.

The head suspension assembly includes a slider having the magnetic head thereon, a suspension supporting the slider, and an arm supporting the suspension. A wiring pattern is fixed to the suspension and the arm. The slider is fixed to the wiring pattern by adhesive bonding, while the magnetic head is connected electrically to the wiring pattern.

The head suspension assembly is rockably supported by means of a bearing assembly. The magnetic head can be moved to any desired position on the magnetic disk by rocking the head suspension assembly by a voice coil motor.

MR heads are widely used as magnetic heads nowadays. However, MR heads are highly susceptible to static electricity, and handling them requires caution in the assembly processes for the magnetic heads and manufacturing processes for the magnetic disk drives. Static electricity can be effectively dealt with by insulating the path of overcurrent involved in electrostatic discharge by some methods. In one notable method, a head IC is mounted between the magnetic head and electrode terminals of the head suspension assembly. A head suspension assembly mounted with a head IC is described in Jpn. Pat. Appln. KOKAI Publication No. 11-273044, for example.

Recently, a proposal has been made to improve the function of the disk drive by incorporating a write driver and the like, as well as an amplifier, into the head IC. In this case, however, heat has a bad effect on the disk drive. Normally, heat that is generated from the head IC is radiated through the suspension, arm, etc., during operation of the magnetic disk drive. In the case where the write driver and the like are incorporated in the head IC, however, heat generated from the head IC increases and may possibly deform the head suspension. If the head suspension is deformed, it is hard to appropriately support the magnetic head, so that incorrect operation may occur.

BRIEF SUMMARY OF THE INVENTION

The present invention has been contrived in consideration of these circumstances, and its object is to provide a head suspension assembly, in which a suspension and the like can be prevented from being deformed by heat from a head IC, and a disk drive provided with the same.

In order to achieve the above object, a head suspension assembly according to an aspect of the invention comprises: an arm; a suspension extending from the arm; an opening portion penetrating the arm; a trace having a wiring pattern sandwiched between insulating layers, located on the arm and the suspension, and extending opposite to the opening portion, the trace having a first surface situated on the side of the arm and the suspension and a second surface situated opposite the first surface; a head mounted on the second surface side of the trace and situated on a distal end portion of the suspension; a radiator plate attached to the second surface of the trace and extending at least opposite to the opening portion; and a head IC located in the opening portion and connected electrically to the wiring pattern of the trace.

Further, a disk drive according to another aspect of the invention comprises: a disk; a drive element supporting the disk and configured to rotate the disk; a head suspension assembly according to claim 1 supporting a head which is configured to record information in and reproduce it from the disk; and a bearing portion supporting the head suspension assembly allowing rocking motion with respect to the disk, the radiator plate of the head suspension assembly facing a surface of the disk.

According to the head suspension assembly and the disk drive constructed in this manner, heat generated from the head IC during operation of the drive is transmitted to the radiator plate on the trace and discharged to the outside through the radiator plate. Thus, heat from the head IC can be discharged efficiently so that the suspension and the like can be prevented from being deformed by heat.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A hard disk drive (hereinafter referred to as an HDD) as a disk drive with a head suspension assembly according to an embodiment of the present invention, will now be described in detail with reference to the accompanying drawings.

Figure 1:
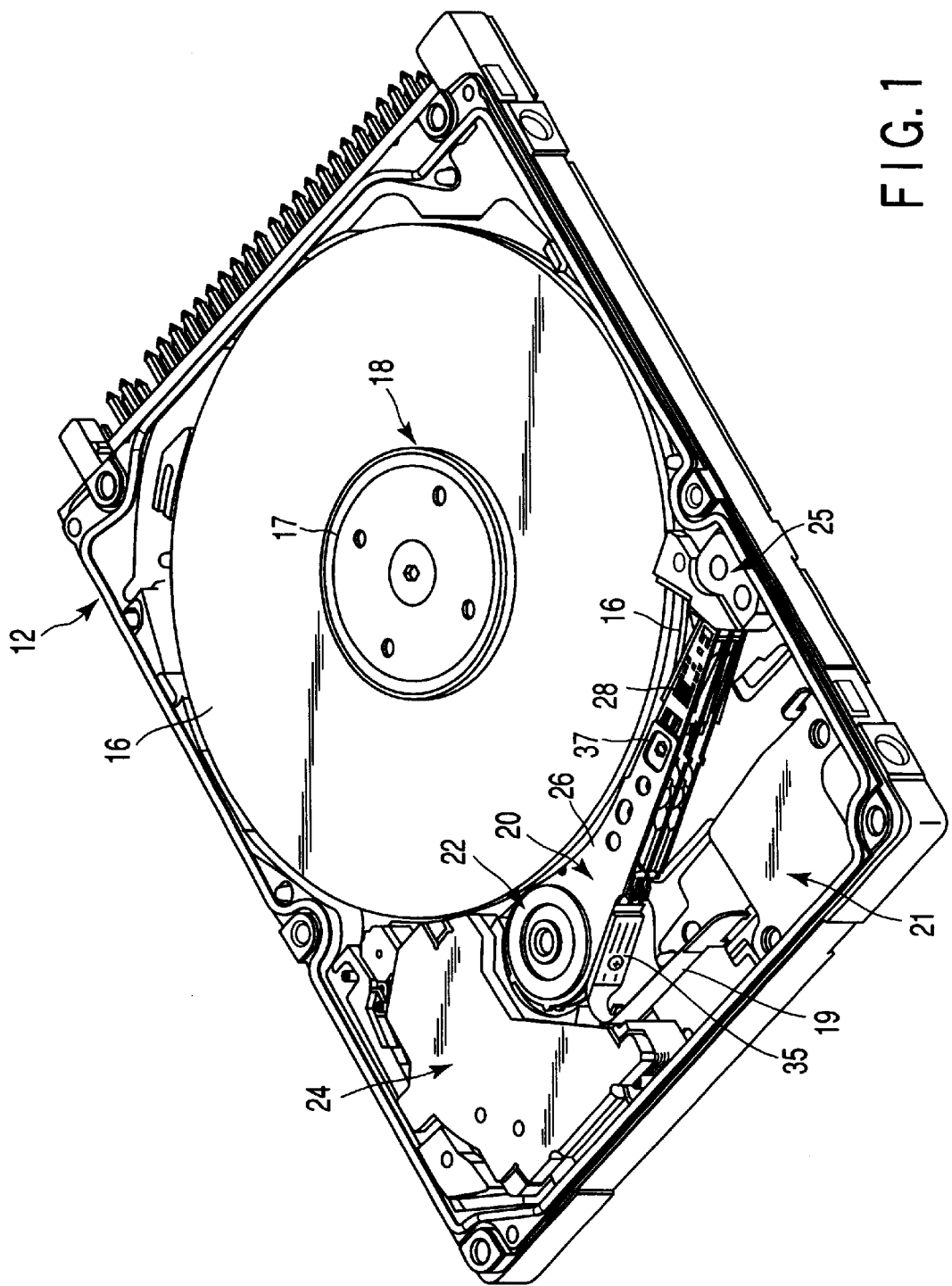
FIG. 1 is a perspective view showing a hard disk drive provided with a head suspension assembly according to an embodiment of the invention.

As shown in FIG. 1, the HDD comprises a case 12 in the form of an open-topped rectangular box and a top cover (not shown) that is fixed to the case by means of a plurality of screws and closes the top opening of the case.

The case 12 has therein, e.g., two magnetic disks 16 for use as recording media, a spindle motor 18 for supporting and rotating the magnetic disks 16, and a plurality of head suspension assemblies 20, each of which includes a magnetic head (mentioned later) for reading information from and writing it to each magnetic disk 16. The case 12 further has therein a bearing assembly 22 as a bearing portion, a voice coil motor (hereinafter referred to as a VCM) 24, a ramped loading mechanism 25, and a board unit 21. The bearing assembly 22 supports the head suspension assemblies 20 allowing rocking motion with respect to the magnetic disks 16. The VCM 24 serves to rock and position the head suspension assemblies 20. The ramped loading mechanism 25 holds each magnetic head at a distance from each magnetic disk 16 when the head is moved to the outermost periphery of the disk.

A printed circuit board (not shown) for controlling the operation of the spindle motor 18, the VCM 24, and the magnetic heads through the board unit 21 is screwed to the outer surface of the bottom wall of the case 12.

Each magnetic disk 16 has a diameter of 65 mm (2.5 inches) and bears magnetic recording layers on its upper and lower surfaces, individually. The magnetic disk 16 is coaxially fitted on a hub (not shown) of the spindle motor 18 and held in position by means of a clamp spring 17. The two magnetic disks 16 are rotated at a given speed by the spindle motor 18.

Figure 2:
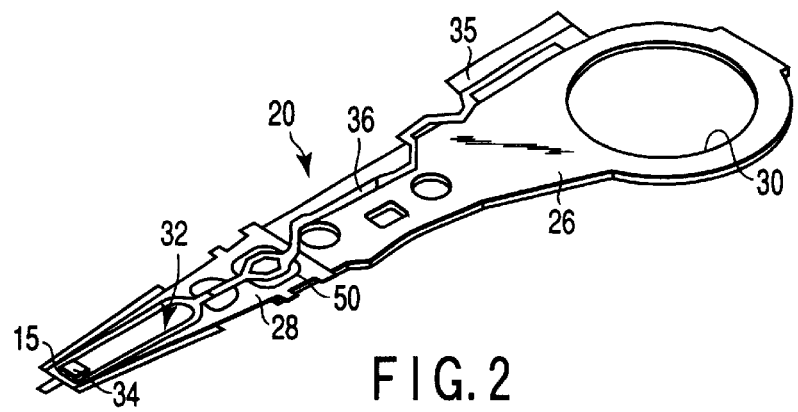
FIG. 2 is a perspective view showing the second principal surface side of the head suspension assembly.
Figure 3:
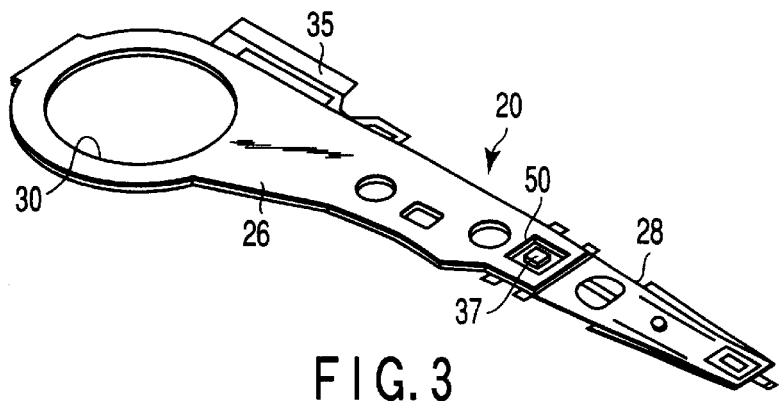
FIG. 3 is a perspective view showing the first principal surface side of the head suspension assembly.
Figure 4:
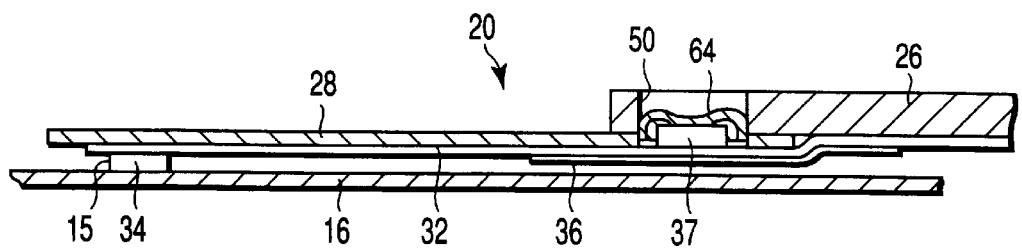
FIG. 4 is a sectional view of the head suspension assembly.

As shown in FIGS. 2 to 4, each head suspension assembly 20 is provided with an arm 26 and a suspension 28. The suspension 28 extends from the arm 26, having its proximal end fixed to the distal end of the arm by spot welding or adhesive bonding. The arm 26 is a thin flat sheet that is formed of a material based on stainless steel such as SUS304 or the like and has a thickness of about 0.3 mm. A circular aperture 30 is bored in the proximal end of the arm 26. The suspension 28 is composed of an elongate leaf spring with a thickness of 100 $\mu$m or less. The distal end portion of the arm 26 has a substantially rectangular opening portion 50 that penetrates the arm and the suspension 28. The suspension 28 may be of the same material as and integrally with the arm 26.

The head suspension assembly 20 includes a trace 32, which is fixed to the suspension 28 and the arm 26, and a slider 34 and a head IC 37, which are mounted on the trace.

The trace 32 is an elongated belt-shaped structure, which includes a lining plate of stainless steel and an FPC for relaying (hereinafter referred to as a relay FPC) that is formed on the lining plate and has a wiring pattern. The trace 32 is fixed to those respective surfaces of the suspension 28 and the arm 26 which face the surface of the magnetic disk 16, and extends from the distal end of the suspension 28 to the middle portion of the arm 26. A soldering pad portion 35 that is provided on the proximal end portion of the trace 32 extends outward from the arm 26. Further, a radiator plate 36 is provided on the outer surface or that surface of the trace 32 which faces the surface of the magnetic disk 16. The radiator plate 36 is formed of copper, for example, and radiates heat released from the head IC 37. The radiator plate 36 is formed having substantially the same width as the trace 32, and extends on the trace 32 ranging from an intermediate portion of the suspension 28 to an intermediate portion of the arm 26.

As mentioned later, the relay FPC of the trace 32 has the wiring pattern that includes a plurality of conductor wires. Each conductor wire is provided with a pad portion to which each magnetic head is connected and a pad portion to which the head IC 37 is connected. Further, a soldering pad portion 35 of the trace 32 constitutes a connecting end portion of the trace 32, and has a plurality of electrode pads equal in number to the conductor wires. As shown in FIG. 1, the soldering pad portion 35 is connected to a main FPC 19 that extends from the board unit 21.

The slider 34 is mounted on that surface (second principal surface) of the trace 32 which faces the surface of the magnetic disk 16, and is supported on the distal end portion of the suspension 28. A magnetic head 15 for use as an electromagnetic conversion element is formed on the distal end face of the slider 34. Electrodes of the magnetic head 15 are connected to the pad portions in the wiring pattern of the relay FPC by ultrasonic bonding such as GBB (gold-ball bonding).

The slider 34 is urged toward the magnetic disk 16 by the suspension 28 formed of a leaf spring. When the HDD is operating, the slider 34 serves to lift the magnetic head 15 for a substantially fixed distance above the magnetic disk surface by the pneumatic pressure that is generated as the magnetic disk 16 rotates. The magnetic head 15 used is a composite, separate-type magnetic head that includes an MR element (magnetoresistive-effect element) for reproduction (read) and a thin-film head for recording (write).

The head IC 37, which has an amplifier, write driver, etc., built-in, is mounted on that surface (first principal surface) of the trace 32 which faces the suspension and the arm, and is supported on the proximal end portion of the suspension 28. The head IC 37 is held in the opening portion 50 that is formed in the suspension 28 and the arm 26.

Figure 5:
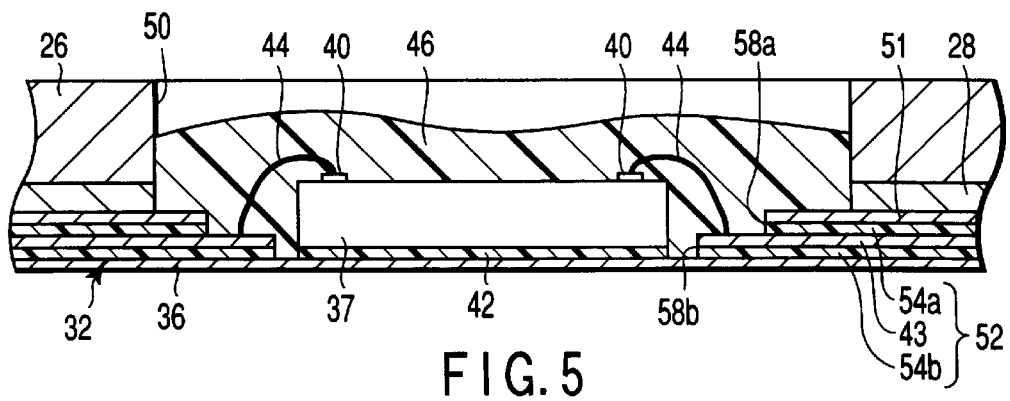
FIG. 5 is an enlarged sectional view showing a head IC mounting region of the head suspension assembly.

As shown in FIG. 5, the trace 32 is fixed to the suspension 28 and the arm 26 in a manner such that a lining plate 51 of stainless steel is in contact with the respective surfaces of the suspension 28 and the arm 26. A relay FPC 52 that constitutes the trace 32 includes a first insulating layer 54a of polyimide or the like formed on the lining plate 51, a wiring pattern 43 formed of a conductor layer on the insulating layer, and a second insulating layer 54b superposed on the wiring pattern. Further, the radiator plate 36 is fixed to the outer surface of the trace 32, that is, to the outer surface of the second insulating layer 54b.

An opening portion 54 that penetrates the arm 26 and the suspension 28 is substantially rectangular and has a plane area greater than that of the head IC. The trace 32 is fixed to the arm 26 and the suspension 28 so as to cross the region over the opening portion 54.

In the mounting region for the head IC 37, a first opening 58a that has a plane area greater than that of the head IC 37 is formed in the lining plate 51 and the first insulating layer 54a of the trace 32, and communicates with the opening portion 50. Further, the wiring pattern 43 and the second insulating layer 54b are formed having a second opening 58b that has a plane area greater than that of the head IC 37 and smaller than that of the first opening 58a. The second opening 58b is situated inside the first opening 58a. Thus, a part of the wiring pattern 43 is exposed to the inside of the first opening 58a. Furthermore, the radiator plate 36 is located so as to close the outer end of the second opening 58b on the side of the magnetic disk 16.

The head IC 37 has a main surface on which electrodes 40 are provided, and a rear surface opposite the main surface. The head IC 37 is located in the first and second openings 58a and 58b, and its entire rear surface is fixed to the radiator plate 36 with a thermally conductive adhesive 42. Each electrode 40 of the head IC 37 is connected to the pad portion of the wiring pattern 43 by means of a wire 44, for example.

The head IC 37 is composed of a bare chip with a thickness of 0.05 to 0.5 mm. A sealant 46 that is poured into the opening portion 50 and the first and second openings 58a and 58b covers the entire outer surface of the head IC 37. A resin called underfill that has excellent insulating properties and good thermal conduction is used as the sealant 46, for example. The sealant 46 that fills the opening portion 50 is in contact with the arm 26 so that heat from the head IC 37 can be transferred to the arm 26.

The head suspension assembly 20 constructed in this manner is attached to the bearing assembly 22 in a manner such that a hub of the bearing assembly is passed through the aperture 30 of the arm 26. The soldering pad portion 35 of the trace 32 is connected to the main FPC 19 that extends from the board unit 21. Thus, the magnetic head 15 and the head IC 37 are connected electrically to the board unit 21 of the HDD through the wiring pattern 43. When the head suspension assembly 20 is rocked around the bearing assembly 22 by the VCM 24, the magnetic head 15 supported on the distal end portion of the suspension 28 is moved substantially in the radial direction of the magnetic disk 16 and faces a desired track on the disk surface. In this state, information can be recorded in or reproduced from the magnetic disk 16.

According to the head suspension assembly and the HDD constructed in this manner, heat generated from the head IC 37 during operation of the HDD is transmitted to the radiator plate 36 via the adhesive 42. Since the radiator plate 36 is situated opposite the surface of the magnetic disk 16, it is air-cooled by means of an airflow generated over the surface of the magnetic disk, while rotates at high speed. Thus, heat can be released efficiently. Further, some of heat generated from the head IC 37 is diffused to the arm 26 via the sealant 46 and radiated to the outside through the arm. Thus, heat from the head IC can be radiated more efficiently. Even in the case where the mounted head IC 37 has therein the write driver and the like and releases plenty of heat, therefore, the suspension 28 and the like cannot be heated excessively, and these elements can be prevented from being deformed by heat.

Further, the head IC 37 is located on the side opposite the surface of the magnetic disk 16, and at the same time, in the opening portion 50 in the suspension 28 and the arm 26. Even if a heavy impact acts on the HDD, therefore, collision between the head IC 37 and the magnetic disk 16 can be prevented. Since the sealant 46 covers the head IC 37, moreover, broken pieces, if any, of the head IC that is composed of a bare chip can be prevented from falling onto the magnetic disk 16.

Since the head IC 37 is located in the opening portion 50, it never hinders assembly operation for the HDD, so that assembly efficiency is improved. At the same time, the head IC 37 never touches assembly tools, so that it can be securely prevented from being damaged. Normally, the arm 26 has a thickness equal to the sum of the thickness, 0.25 to 0.35 mm, of the arm itself and that of the suspension. In the case where the head IC 37 is held in the opening portion 50 of the arm, therefore, an IC with a thickness of 0.20 to 0.30 mm can be used as the head IC without influencing the gap between the head IC and the magnetic disk surface. Thus, the productivity of the head IC can be improved, and the incidence of defects during dicing operation can be lowered. In consequence, there can be provided a head suspension assembly that ensures reduction in manufacturing cost and improved reliability and an HDD provided with the same.

Figure 6:
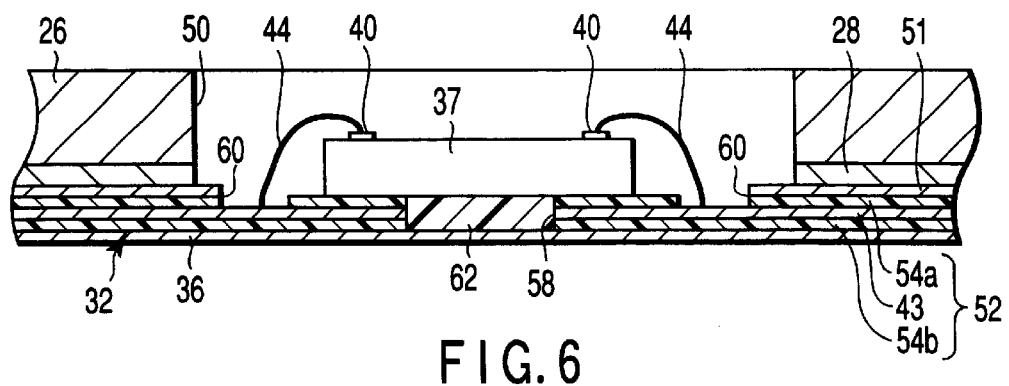
FIG. 6 is an enlarged sectional view showing a head IC mounting region of a head suspension assembly according to a second embodiment of the invention.

The following is a description of a second embodiment of the invention. According to the present embodiment, as shown in FIG. 6, a head IC 37 is held in an opening portion 50 that penetrates a suspension 28 and an arm 26. The opening portion 50 has a substantially rectangular plane area that is greater than that of the head IC. A trace 32 is fixed to the arm 26 and the suspension 28 so as to cross the region over the opening portion 54.

In the mounting region for the head IC 37, an opening 58 having a plane area smaller than that of the head IC 37 is formed penetrating a lining plate 51 and a relay FPC 52 of the trace 32. The lining plate 51 and a first insulating layer 54a have a plurality of small openings 60, which are situated around the opening 58. The openings 60 are opposed individually to connecting pad portions of a wiring pattern 43 so that the connecting pad portions are exposed to the inside of the opening portion 50 through the openings 60. Further, a radiator plate 36 is located so as to close the outer end of the opening 58 on the side of the surface of the magnetic disk 16.

The head IC 37 that is held in the opening portion 50 is located on the trace 32 in a manner such that its rear surface opposite the surface that carries electrodes 40 thereon is in contact with the lining plate 51 and covers the opening 58. Further, the head IC 37 is fixed to the radiator plate 36 with an adhesive 62 that fills the opening 58. An adhesive with good thermal conduction is used as the adhesive 62. Each electrode 40 of the head IC 37 is connected to a connecting pad portion of the wiring pattern 43 through each corresponding opening 60 by means of a wire 44, for example.

The second embodiment shares other configurations with the first embodiment described above. Therefore, like reference numerals are used to designate like portions throughout the drawings, and a detailed description of those portions will be omitted.

According to the second embodiment arranged in this manner, heat generated from the head IC 37 during operation of the HDD is transmitted to the radiator plate 36 via the adhesive 62. The radiator plate 36 is air-cooled by means of an airflow generated over the surface of the magnetic disk, which rotates at high speed. Thus, heat can be released efficiently. Even in the case where the mounted head IC 37 releases a lot of heat, therefore, the suspension 28 and the like cannot be heated excessively, and these elements can be prevented from being deformed by heat. The second embodiment can provide the same other functions and effects as the first embodiment.

According to the second embodiment, moreover, a part of the trace 32 remains between the head IC 37 and the radiator plate 36, so that the mechanical strength of the head IC mounting region can be improved.

In the second embodiment, as in the first embodiment, a sealant formed of a resin or the like with excellent insulating properties and good thermal conduction may be used to cover the entire outer surface of the head IC 37.

Figure 7:
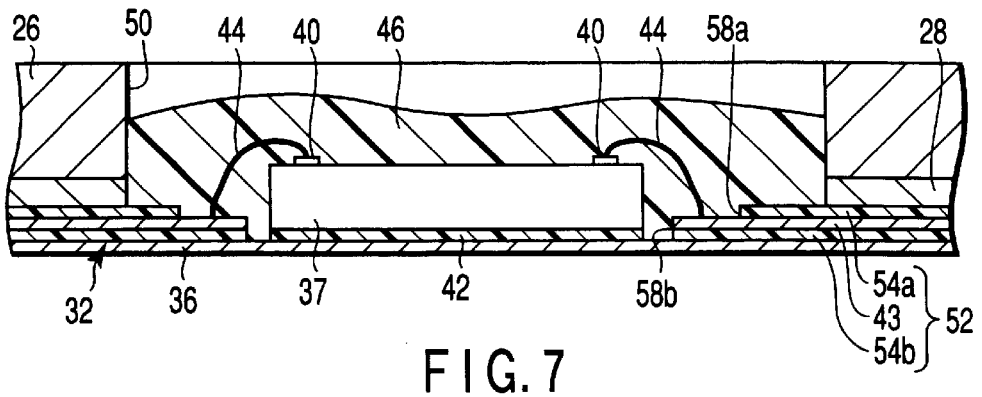
FIG. 7 is an enlarged sectional view showing a head IC mounting region of a head suspension assembly according to a modification of the invention.

The present invention is not limited to the embodiments described above, and various changes and modifications may be effected therein without departing from the scope or spirit of the invention. As shown in FIG. 7, for example, the trace 32 may be comprised of the relay FPC 52 alone without using any lining plate.

Alternatively, the trace 32 that includes the lining plate 51 and the relay FPC 52 may be located so that the relay FPC is in contact with the respective surfaces of the arm 26 and the suspension 28. In this case, the lining plate can double as a radiator plate.

Figure 8:
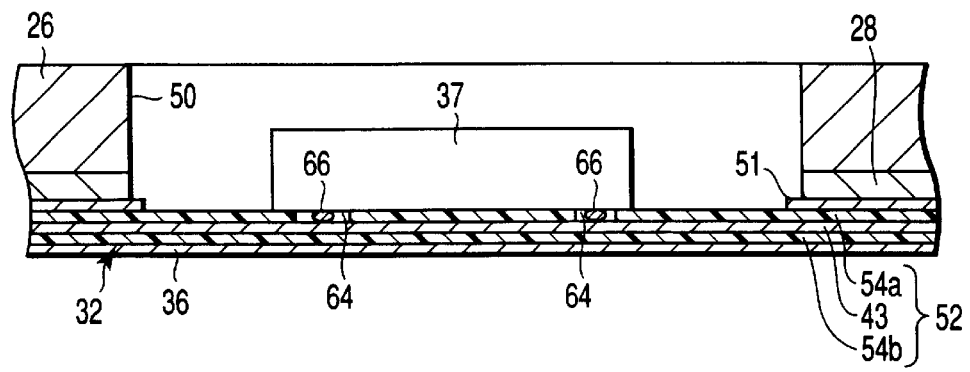
FIG. 8 is an enlarged sectional view showing a head IC mounting region of a head suspension assembly according to another modification of the invention.

As shown in FIG. 8, moreover, the head IC 37 may be mounted so that its main surface that carries the electrodes thereon is situated on the trace side. In this case, the first insulating layer 54a has a plurality of small openings 64, which are situated opposite the connecting pad portions of the wiring pattern 43, individually. The head IC 37 are mounted on the trace 32, and the electrodes of the head IC is connected to the wiring pattern 43 in a manner such that bumps 66 formed of a solder ball each, for example, are located in their corresponding openings 64 and soldered individually to the connecting pad portions of the wiring pattern 43. Further, a radiator plate 36 that resembles the ones according to the foregoing embodiments is fixed to the outer surface of the trace 32 that faces the surface of the magnetic disk.

In this arrangement, heat generated from the head IC 37 can be transmitted to the radiator plate 36 through the trace 32 and discharged efficiently to the outside through the radiator plate 36. Even in the case where the mounted head IC 37 releases a lot of heat, therefore, the suspension 28 and the like cannot be heated excessively, and these elements can be prevented from being deformed by heat.

Figure 9:
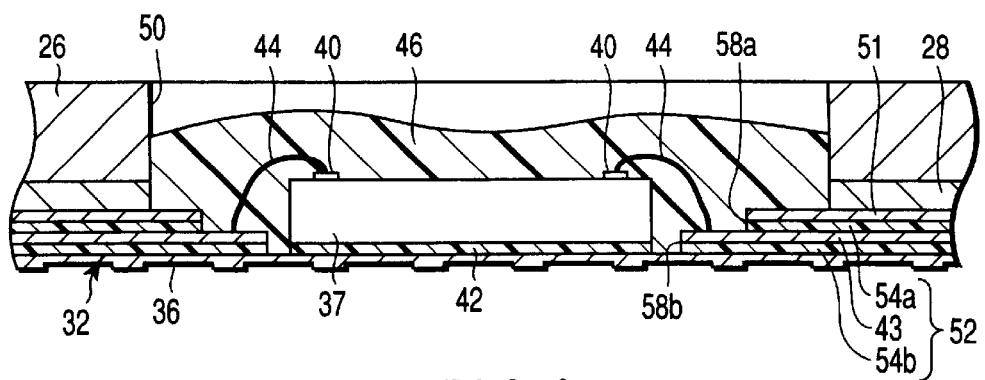
FIG. 9 is an enlarged sectional view showing a head IC mounting region of a head suspension assembly according to still another modification of the invention.

In each of the embodiments described herein, the outer surface of the radiator plate 36 may be made irregular by etching or the like, as shown in FIG. 9. In this case, the surface area of the radiator plate 36 can be increased to improve the heat radiation performance. Further, the respective materials of the radiator plate, adhesive, etc., are not limited to the ones described in connection with the foregoing embodiments, and may be selected as required from other materials.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A head suspension assembly comprising:
   an arm;
   a suspension extending from the arm;
   an opening portion penetrating the arm;
   a trace having a wiring pattern sandwiched between insulating layers, located on the arm and the suspension, and extending opposite to the opening portion, the trace having a first surface situated on the side of the arm and the suspension and a second surface situated opposite the first surface;
   a head mounted on the second surface side of the trace and situated on a distal end portion of the suspension;
   a radiator plate attached to the second surface of the trace and extending at least opposite to the opening portion; and
   a head IC located in the opening portion and connected electrically to the wiring pattern of the trace.

2. A head suspension assembly according to claim 1, wherein the trace has an opening penetrating the trace, communicating with the opening portion of the arm, and having a plane area greater than that of the head IC, and the head IC is located in the opening and fixed to the radiator plate with a thermally conductive adhesive.

3. A head suspension assembly according to claim 2, wherein the head IC has a main surface carrying electrodes thereon and a rear surface situated on the opposite side of the main surface, and is fixed to the radiator plate with the rear surface opposed to the radiator plate.

4. A head suspension assembly according to claim 3, wherein the opening of the trace includes a first opening which is situated on the arm side, has a plane area greater than that of the head IC, and exposing a part of the wiring pattern to the inside of the opening portion; and a second opening situated inside the first opening and having a plane area smaller than that of the first opening and greater than that of the head IC; and
   the head IC is located in the first and second openings, and the electrodes of the head IC are connected to the wiring pattern through the first opening.

5. A head suspension assembly according to claim 1, wherein the trace has an opening penetrating the trace, communicating with the opening portion of the arm, and having a plane area smaller than that of the head IC, and the head IC is mounted on the trace so as to close the opening and is fixed to the radiator plate with a thermally conductive adhesive filling the opening.

6. A head suspension assembly according to claim 5, wherein the head IC has a main surface carrying electrodes thereon and a rear surface situated on the opposite side of the main surface, and is mounted on the trace with the rear surface opposed to the trace.

7. A head suspension assembly according to claim 6, wherein the trace has a plurality of another openings communicating with the opening portion of the arm and allowing a part of the wiring pattern to be exposed, and the electrodes of the head IC are connected to the wiring pattern through the another openings.

8. A head suspension assembly according to claim 1, wherein the head IC has a main surface carrying electrodes thereon and a rear surface situated on the opposite side of the main surface, and is mounted on the trace with the main surface opposed to the trace, and the electrodes of the head IC are connected to the wiring pattern through openings formed in the trace.

9. A head suspension assembly according to claim 1, wherein the trace has a metallic lining plate located on one of the insulating layers, the lining plate being located in contact with the suspension and the arm.

10. A head suspension assembly according to claim 1, wherein the head IC is formed of a bare chip, and an outer surface of the head IC is covered by a thermally conductive sealant filling the opening portion.

11. A head suspension assembly according to claim 1, wherein the radiator plate has an irregular outer surface.

12. A disk drive comprising:
    a disk;
    a drive element supporting the disk and configured to rotate the disk;
    a head suspension assembly according to claim 1 supporting a head which is configured to record information in and reproduce it from the disk; and
    a bearing portion supporting the head suspension assembly for rocking motion with respect to the disk,
    the radiator plate of the head suspension assembly facing a surface of the disk.

* * * * *